United States Patent [19]

Bohsmann et al.

[11] Patent Number: 5,705,126
[45] Date of Patent: Jan. 6, 1998

[54] FRICTION BEARING ALLOY

[75] Inventors: Michael Bohsmann, Stuttgart; Rolf Koring, Jüchen; Manfred Rühle, Ditzingen; Michael Steinhorst, Essen, all of Germany

[73] Assignee: Elektro-Thermit GmbH, Essen, Germany

[21] Appl. No.: 791,086

[22] Filed: Jan. 29, 1997

Related U.S. Application Data

[63] Continuation of Ser. No. 554,623, Nov. 6, 1995, abandoned.

[30] Foreign Application Priority Data

Nov. 12, 1994 [DE] Germany ............................ 44 40 477.8

[51] Int. Cl.[6] .................................................... C22C 13/02
[52] U.S. Cl. ................................................. 420/561; 420/562
[58] Field of Search .................................. 420/561, 562; 428/647

[56] References Cited

FOREIGN PATENT DOCUMENTS

| 4-2739 | 1/1992 | Japan | 420/561 |
|---|---|---|---|
| 2146354 | 4/1985 | United Kingdom | 420/561 |

*Primary Examiner*—Sikyin Ip
*Attorney, Agent, or Firm*—Scully, Scott, Murphy & Presser

[57] ABSTRACT

The invention relates to a plain bearing alloy on a tin basis with antimony and copper, the alloy consisting of 6 to 15% by weight of antimony, 3 to 10% by weight of copper, 0.05 to 1% by weight of silver and 0.1 to 2% by weight of zinc, the remainder being tin.

5 Claims, No Drawings

FRICTION BEARING ALLOY

This application is a continuation of application No. 08/554,623 filed Nov. 6, 1995, now abandoned.

FIELD OF INVENTION

The invention relates to plain bearing alloys based on tin.

BACKGROUND INFORMATION AND PRIOR ART

Bearing materials based on lead and tin have good sliding, running-in, embedding and emergency running properties.

If the bearing is subjected to higher thermal stresses or if the static and dynamic load on the bearing is higher, it is necessary to use tin based bearing metals.

There are national and international standards for such plain bearing alloys, such as DIN ISO 4381, as well as manufacturers specifications, such as TEGO V 738 (Th. Goldschmidt AG). Such an alloy has good sliding qualities, a high static and dynamic load carrying capability in the hydrodynamic range, a high wear resistance, as well as a high elevated temperature hardness and natural stability. They find use in turbines, compressors, pistons and expansion machines.

Common components of all of these alloys are tin, antimony and copper in different amounts, depending on the use.

In order to increase the technical properties to a higher level, cadmium, nickel and arsenic are added to some of the alloys. This is done, for example, in the case of the alloy $SnSb_8Cu_4Cd$ of DIN ISO 4381, as well as, for example, in the case of the alloy TEGO V 738, which has the following composition:

| Pb | maximum | 0.06% | (parts by weight) |
|----|---------|-------|-------------------|
| Sn |         | 80.5% |                   |
| Cd |         | 1.2%  |                   |
| Cu |         | 5.5%  |                   |
| Sb |         | 12.0% |                   |
| Ni |         | 0.3%  |                   |
| As |         | 0.5%  |                   |

Although it would be desirable, from the point of view of protecting the environment, to work without the poisonous metals, Cd, Ni and As, these metals nevertheless were indispensable since, from the point of view of the grain refining and the compression strength achieved, industrially meaningful alternatives were not known.

OBJECT OF THE INVENTION

An object of the present invention is a plain bearing alloy. The inventive alloy has none of the aforementioned metals as components and yet does not forfeit the necessary properties, compared to the state of the art.

SUMMARY OF THE INVENTION

The invention accordingly relates to a plain bearing alloy based on tin, which consists of 6 to 15% by weight of antimony, 3 to 10% by weight of copper, 0.05 to 1% by weight of silver and 0.1 to 2% by weight of zinc, the remainder being tin.

Advantageously, the silver contents are 0.05 to 0.15% by weight and the zinc contents are 0.5 to 0.7% by weight.

Particularly preferred are a silver content of 0.1% by weight and a zinc content of 0.6% by weight.

Inventive plain bearings surprisingly moreover even show advantages with respect to mechanical properties compared to plain bearings of the state of the art, as can be seen from the comparison of the technological data with that for TEGO V 738.

|                          | TEGO V 738 | like TEGO V 738, however, without Cd, Ni, As, but with 0.1% Ag, 0.6% Zn |
|--------------------------|------------|------------------------------------------------------------------------|
| 0.2% compressive strength | 80 N/mm²   | 90 N/mm²                                                               |

As can be seen by the value of the 0.2% compressive strength, an advantage of about 10% is achieved, which results in a corresponding increase in the permissible compression stress.

The alloy also is significantly more resistant to impact/bending fatigue test stresses.

The alloy is processed far more easily during casting as well as soldering, since pores are not formed even under unfavorable conditions.

What is claimed is:

1. A plain bearing alloy based on tin, antimony and copper, comprising of 6 to 15% by weight of antimony, 3 to 10% by weight of copper, 0.05 to 1% by weight of silver and 0.1 to 2% by weight of zinc, the remainder being tin.

2. The plain bearing alloy of claim 1, wherein the silver content is 0.05 to 0.15% by weight.

3. The plain bearing alloy of claim 2, wherein the silver content is 0.1% by weight.

4. The plain bearing alloy of claims 1, 2 or 3, wherein the zinc content is 0.5 to 0.7% by weight.

5. The plain bearing alloy of claims 1, 2 or 3, wherein the zinc content is 0.6% by weight.

* * * * *